United States Patent [19]
Yoshida

[11] 3,830,030
[45] Aug. 20, 1974

[54] DEVICE FOR DETACHABLY COUPLING FURNITURE OR BUILDING MATERIALS

[76] Inventor: Tsukasa Yoshida, 15-202, Nikko Danchi 1-3, Nikkocho, Fuchushi, Tokyo, Japan

[22] Filed: Mar. 7, 1972

[21] Appl. No.: 232,540

[52] U.S. Cl............ 52/584, 52/753 D, 52/756, 16/135
[51] Int. Cl............................. F16b 5/06
[58] Field of Search... 287/20.92 C, 20.925, 20.926, 287/20.927, 20.924, 20.92 E, 20.92 D, 127 R; 52/584, 583, 556, 753 D

[56] References Cited
UNITED STATES PATENTS
| | | | |
|---|---|---|---|
| 3,229,334 | 1/1966 | Thome | 287/20.92 C |
| 3,365,224 | 1/1968 | Thome | 287/20.924 |
| 3,680,899 | 8/1972 | Newcomer | 287/20.92 D |

FOREIGN PATENTS OR APPLICATIONS
| | | | |
|---|---|---|---|
| 1,271,192 | 7/1961 | France | 287/20.92 D |
| 1,298,373 | 6/1969 | Germany | 287/20.92 C |

Primary Examiner—Thomas F. Callaghan
Attorney, Agent, or Firm—Wenderoth, Lind & Ponack

[57] ABSTRACT

A device for detachably coupling furniture or building materials including basically two or more anchor bolts, a connection pipe, a base plate, a clamping bolt and a clamping stator. The anchor bolts are inserted and fixed into the respective connected materials and have neck and head portions projecting from the end face of the materials. The connection pipe is provided with at least one aperture on each of the sides thereof to receive the neck portion of the anchor bolts therethrough, and is interposed between at least two opposed materials. The base plate holds the head of the clamping bolt and is fitted near in the interior of the pipe at one end thereof. The clamping stator is closely placed within the interior of the pipe and is provided with a threaded portion on a central portions thereof to receive the clamping bolt, slats on side portions thereof to strongly clamp the neck portions of the bolts.

6 Claims, 14 Drawing Figures

PATENTED AUG 20 1974

3,830,030

DEVICE FOR DETACHABLY COUPLING FURNITURE OR BUILDING MATERIALS

BACKGROUND OF THE INVENTION

The present invention relates to a device for coupling materials to consitute display shelves, partitions, furniture or the like or building materials.

According to the present invention, the coupling device is provided with at least one anchor bolt inserted into the respective connected materials and having neck and head portions projecting from the materials, a connection pipe with at least one aperture on each of the sides thereof for receiving an anchor bolt therein, a base plate fitted near in the interior of the pipe at one end thereof and having a through hole at the center thereof, a clamping bolt passed through the hole into the interior of the pipe, and a clamping stator with at least one slot on each of the sides thereof to clamp the neck portion of the anchor bolt extending into the pipe, whereby two or more connected materials are detachably coupled by means of simply rotating the clamping bolt.

It is a principal object of the present invention to provide a device for coupling materials together by a single motion of rotating a clamping bolt, whereby coupling can be achieved speedily and simply, and without any fear that the coupled materials will be detached from the device.

It is another significant object of the present invention to provide a device for detachably coupling materials in a manner suited for the mass-production at a low cost.

Still another object of the present invention is to provide a coupling device, wherein in view of the possible polygonal peripheral sides of a connection pipe thereof, two materials in general can be coupled opposite to each other, but more materials can be coupled in respective different directions at the same time in order to avoid the use of additional coupling devices different in construction for complicated fabrications. Accordingly, the use of this device can be widely extended to require only slight labor to achieve complicated constructions.

Yet still another object of the present invention is to provide a coupling device for combination with one or more doors by use of a clamping base plate with a special design.

Other objects and advantages of the present invention will be made more apparent hereinafter.

BRIEF DESCRIPTION OF THE DRAWING

There are shown in the attached drawings preferred embodiments of the present invention, wherein.

DETAILED DESCRIPTION OF THE PREFERRED EMBODIMENTS OF THE INVENTION

Figure 3:
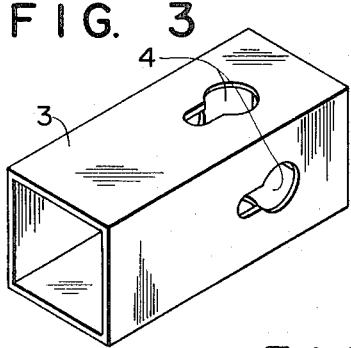
FIG. 3 is a perspective view representing a connection pipe according to the present invention.
Figure 4:
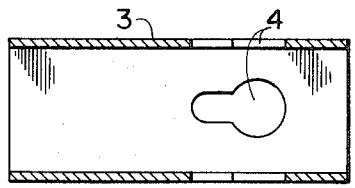
FIG. 4 is a longitudinal section view of the connection pipe in FIG. 3.
Figure 5:
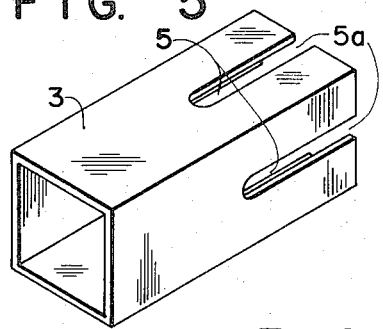
FIG. 5 is a perspective view representing another connection pipe according to the present invention.
Figure 6:
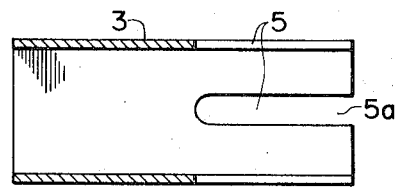
FIG. 6 is a longitudinal section view of the connection pipe in FIG. 5.
Figure 7:
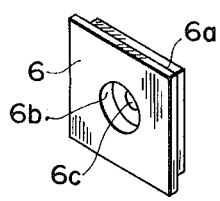
FIG. 7 is a perspective view representing a base plate according to the present invention.
Figure 8:
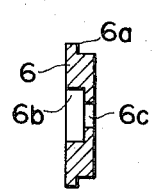
FIG. 8 is a section view of the base plate in FIG. 7.
Figure 9:
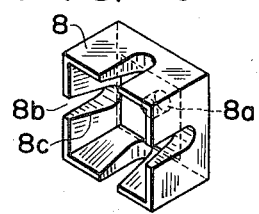
FIG. 9 is a perspective view representing a clamping stator according to the present invention.
Figure 10:
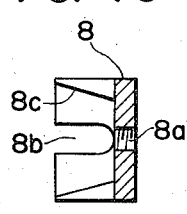
FIG. 10 is a longitudinal section view of the clamping stator in FIG. 9.
Figure 13:
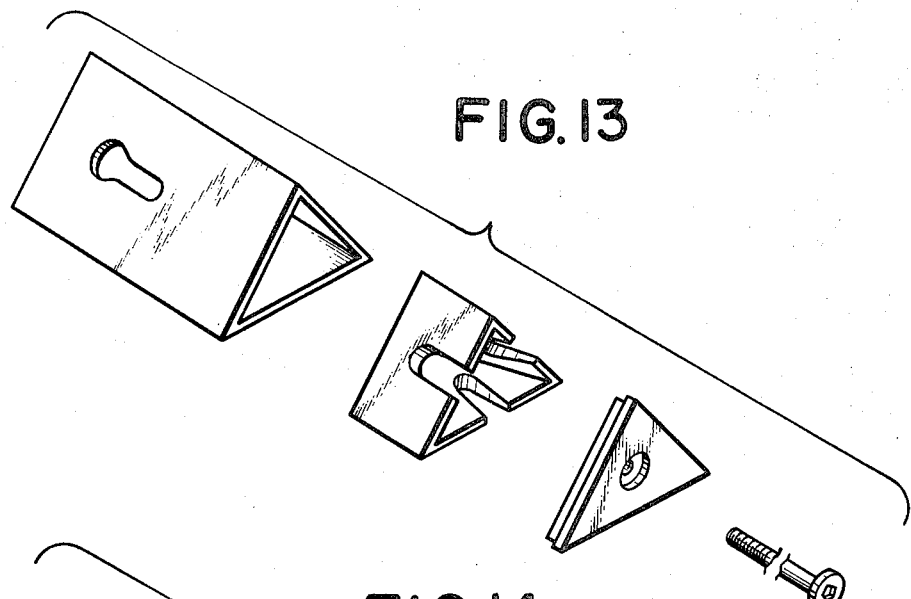
FIG. 13 is an exploded perspective view of the device of the present invention wherein the pipe has a triangular configuration.
Figure 14:
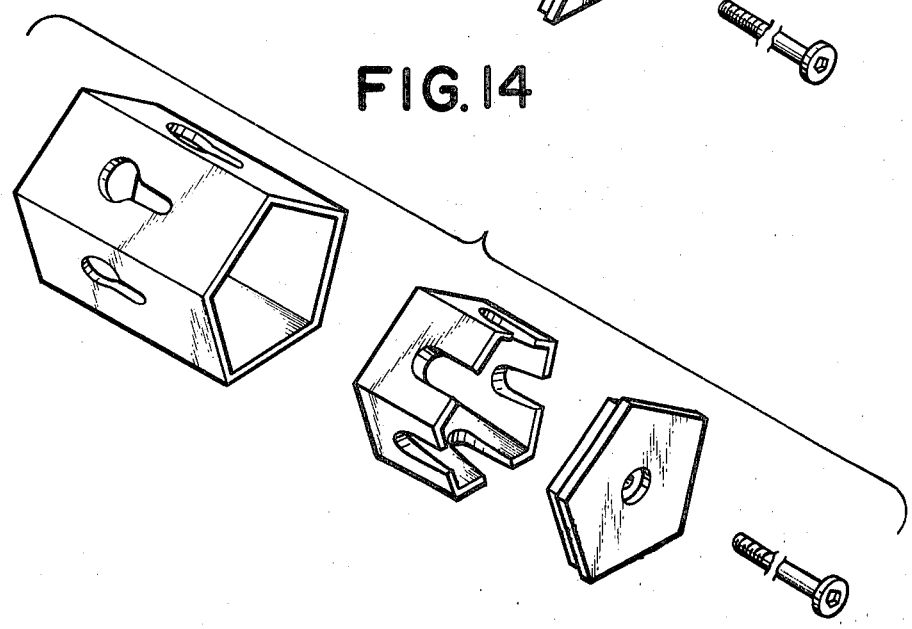
FIG. 14 is an exploded perspective view of the device of the present invention wherein the pipe has a pentagonal configuration.

Referring to the drawings, anchor bolts 2, 2 are embedded in the respective panels 1a, 1b with the neck and head portions 2b, 2a projecting from the end faces of the panels. A connection pipe 3 is closely interposed between the two panels and is provided with an aperture 4 on the respective upper and lower sides, thereby allowing the bolt head portion 2a to extend into the interior of the pipe through the aperture. This aperture 4 as shown in FIG. 3 or FIG. 4 has a key hole shape, composed of a round hole sized to receive the bolt head portion 2a and a narrower slot of a width greater than neck portion 2b but smaller than head portion 2a. As an alternative, the aperture 4 as shown in FIG. 5 and FIG. 6 can be exemplified as a single slot of a width geeater than neck portion 2b but smaller than head portion 2a and extending from the back end of the connection pipe. The connection pipe 3 may be a rectangular tube in most cases, wherein from two to four materials can be coupled at a time. However, a triangular shape (see FIG. 13) or pentagonal shape (See FIG. 14) or other polygonal shapes can be selected, when the number of connected materials as well as the angle of one relative to the adjacent connected material can be correspondingly determined. In addition, the length of the connection pipe may be determined properly in view to the opposed materials and their appearance. A base plate 6 is combined with the pipe 3. This base plate is provided with a part 6a to fit on the front end face of the connection pipe, with an aperture 6b in the center to receive a clamping bolt head 7a, and with a bore 6c to pass a clamping bolt 7 therethrough. The clamping bolt extends through the base plate and is rotatably carried to have the head stored in the aperture 6b. A clamping stator 8 is positioned within the interior of the connection pipe 3 to achieve the completion of coupling operation. This stator is composed of a bottom plate provided with a tapped hole 8a to receive the clamping bolt 7. On each side of the stator there is cut a slot 8b extending from the open end toward the bottom plate to clamp the bolt neck portion 2b and having a width less than the bolt head portion 2a. Each side of the stator is also made gradually thicker from the open end to the bottom end thereof to form a tapered internal surface 8c. Thereby the back inclined face of the bolt head portion 2a is forced tightly to fit on the tapered surface to insure a rigid coupling, and the coupling stator is thus positioned to threadably receive the clamping bolt.

Figure 1:
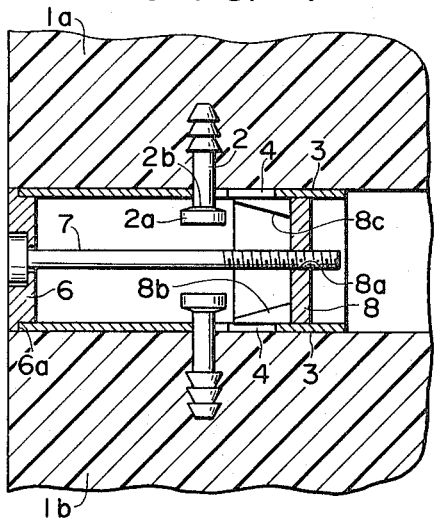
FIG. 1 is a partial section view of the device embodying the present invention prior to coupling two panels.
Figure 2:
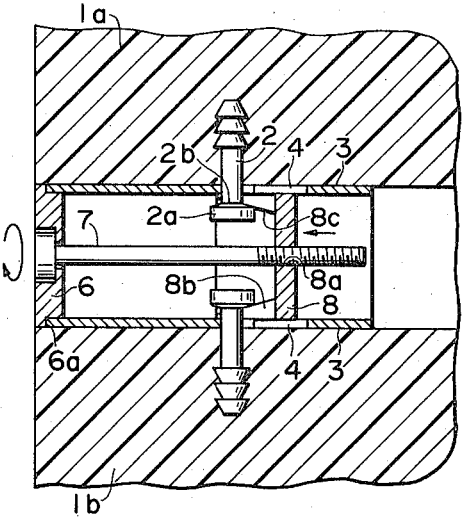
FIG. 2 is a partial section view of the device in FIG. 1 but in the condition that the two panels are coupled.
Figure 11:
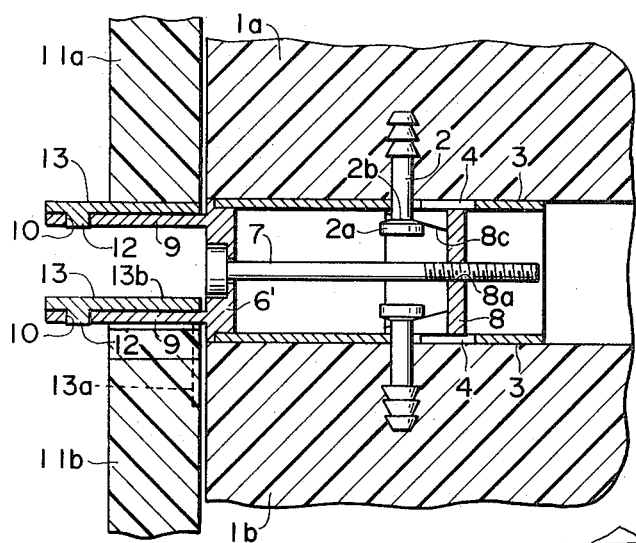
FIG. 11 is a partial section view of the device in FIG. 2 but having a base plate with parts to pivotably support two doors.
Figure 12:
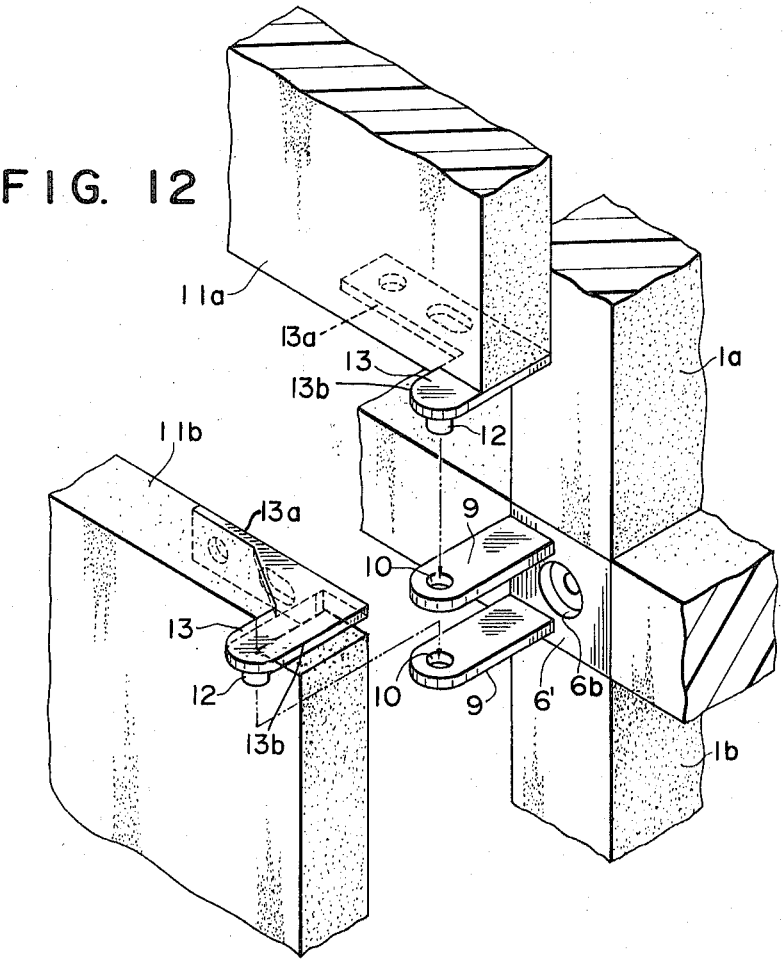
FIG. 12 is a partial perspective view representing the door supporting parts in FIG. 11.

Since the present device is constructed as above, only the clamping bolt 7 need be rotated to effect the coupling of panels 1a and 1b or the uncoupling thereof, with the stator being moved between the positions of FIG. 1 and FIG. 2 to secure the coupling or uncoupling of panels 1a, 1b. According to the present invention, connected materials can be coupled not only on the sides of the connection pipe but also on the end faces of the same, as shown in FIG. 11 and FIG. 12. FIG. 11 and FIG. 12 illustrate the present device in combination with doors pivotably installed. In this case, a base plate 6' is provided as integrally formed with two parallel forward projecting supports 9 each having a hinge pin receiving hole 10 in the vicinity of the extremity thereof.

The projecting length of the supports 9 is determined by addition to the thickness of doors of about twice the distance between the center point of the hole and the extremity of the supports, in such manner that the supports may be longer by the distance from the outer surfaces of the doors when they are closed. It is thus simply to carry out the installation and removal of doors. The supports may project from above and below the bolt receiving aperture 6b, i.e. the upper protrusion supports the lower corner part of an upwardly arranged door and the lower protrusion supports the upper corner part of a downwardly arranged door. It is also possible to provide two supports parallel to each other on the upper part of a base plate 6' and more two supports parallel to each other on the lower part of the base plate, thereby four protrusions are provided on a base plate 6'. The provision of four supports on a base plate implies the arrangement of upper left and right doors as well as lower left and right doors together. When four different base plates provided with one, two, three or four supports respectively are prepared, it is possible to combine doors at any desired position. A door is secured by screws to a fixture 13. This fixture consists of a vertical frame 13a secured to the back face of a door by screws, a horizontal frame 13b extending forward and perpendicular to frame 13a and a downwardly directed hinge pin 12 which is provided on the horizontal frame. The length of the frame 13b is determined in such a manner that about twice the distance from the center point of the hinge pin 12 to the extremity of the frame 13b may extend from the outer surface of the door. The lower end of a door 11a is closely attached on the upper side of a frame 13b to secure the vertical frame 13a together. The upper corner part of the door is recessed to provide a space where the frame 13a is placed and fixed on a level with the upper surface of the door. This space is further extended as much as the thickness of a support 9 to draw-in the support. By passing the hinge pin 12 through the hole 10, the door can be pivotably installed.

In the Claims:

1. A device for releasably coupling a plurality of members, said device comprising at least one anchor bolt, including a neck and head portion, adapted to be imbedded into an end face of each of said members to be coupled, said neck and head portion of each of said bolts projecting above the surface of each of said end faces; an elongated connection pipe having a polygonal cross-section adapted to be positioned between said members to be coupled, each of at least two of the sides of said pipe having an aperture therein, each of said apertures being adapted to closely surround the neck portion of one of said bolts imbedded in said members to be coupled; a base plate provided with a through hole therein adapted to be connected to one end of said pipe; an elongated threaded clamping bolt adapted to be passed through said through hole and extend into the interior of said pipe; a clamping stator having a polygonal cross-section which is substantially the same as the cross-section of said pipe adapted to be inserted into the other end of said pipe, said clamping stator having a bottom plate with a threaded aperture therein to receive the thread on said clamping bolt, each of at least two of the sides of said clamping stator having a slot therein adapted to closely surround the neck portion of one of said anchor bolts said at least two sides of said clamping stator comprising walls having internal tapered surfaces, the thicker ends thereof being adjacent said bottom plate whereby threading said clamping bolt into said stator forces said at least two sides of said stator into tight engagement with the head of said anchor bolts and the inside wall of the pipe.

2. The device as claimed in claim 1 wherein said apertures in the walls of said pipe are in the shape of a keyhole, the larger part of said keyhole aperture being larger than both the neck and head portions of said anchor bolts and the smaller part of said aperture being larger than said neck portion but smaller than said head portion.

3. The device as claimed in claim 1 wherein said apertures in the walls of said pipe comprise elongated slots cut from the other end of said pipe, the width of said slots being larger than said neck portion of said anchor bolts but smaller than said head portions.

4. The device as claimed in claim 1 wherein the cross-section of said pipe is triangular.

5. The device as claimed in claim 1 wherein the cross-section of said pipe is rectangular.

6. The device as claimed in claim 1 wherein the cross-section of said pipe is pentagonal.

* * * * *